United States Patent [19]

Schoening

[11] Patent Number: 4,728,492

[45] Date of Patent: Mar. 1, 1988

[54] ROOF REFLECTOR FOR A SMALL HIGH TEMPERATURE REACTOR

[75] Inventor: Josef Schoening, Hambruecken, Fed. Rep. of Germany

[73] Assignee: Hochtemperatur-Reaktorbau GmbH, Fed. Rep. of Germany

[21] Appl. No.: 827,205

[22] Filed: Feb. 4, 1986

Related U.S. Application Data

[63] Continuation of Ser. No. 553,035, Nov. 18, 1983, abandoned.

[30] Foreign Application Priority Data

Dec. 6, 1982 [DE] Fed. Rep. of Germany ....... 3245021

[51] Int. Cl.[4] ............................................. G21C 11/06
[52] U.S. Cl. .................................... 376/458; 376/381; 376/459
[58] Field of Search ............... 376/285, 287, 304, 381, 376/382, 383, 458, 459

[56] References Cited

U.S. PATENT DOCUMENTS

| | | | |
|---|---|---|---|
| 1,130,324 | 3/1915 | Owen | 376/459 |
| 3,115,448 | 12/1963 | Hackney et al. | 376/304 |
| 4,300,984 | 11/1981 | Katscher et al. | 376/459 |
| 4,442,066 | 4/1984 | Schoening et al. | 376/381 |
| 4,459,261 | 7/1984 | Kolodzey et al. | 376/381 |

FOREIGN PATENT DOCUMENTS 1018299 1/1966 United Kingdom .

*Primary Examiner*—Deborah L. Kyle
*Assistant Examiner*—Richard L. Klein
*Attorney, Agent, or Firm*—Robert J. Koch

[57] ABSTRACT

A roof reflector for a small, high temperature reactor with a hot gas collector space arranged above the roof reflector comprises a side reflector arranged under the roof reflector around a reactor core with a thermal side shield arranged around both the side reflector and the roof reflector. The roof reflector is composed of individual, mutually supporting, wedge-shaped graphite blocks and is supported on the thermal side shield by means of springingly elastic fastening elements in a radially expandable manner.

2 Claims, 2 Drawing Figures

ROOF REFLECTOR FOR A SMALL HIGH TEMPERATURE REACTOR

This application is a continuation of application Ser. No. 553,035, filed Nov. 18, 1983, now abandoned.

BACKGROUND OF THE INVENTION

1. Field of the Invention

The present invention concerns a roof reflector for a small high temperature reactor. The reactor has a reactor core, a roof reflector above the core, a hot gas collector space arranged above the roof reflector, a side reflector and a thermal shield arranged around the side reflector and the roof reflector.

2. Background of the Prior Art

Because of the exposure to high temperatures and radiation, and in view of its large span, the roof reflector cannot be designed as an unsupported roof structure.

A suspended mounting of the reflector, for example, by means of metal fastening elements, is not possible because of the hot gas collector space located above the reflector. These fastening elements would have to be replaced under certain conditions several times during the entire operating life of the nuclear power plant of approximately 40 years which would be highly detrimental. A rigid mounting of the roof reflector is also not possible, because it is exposed to high temperature fluctuations and must provide for expansion movements.

SUMMARY OF THE INVENTION

It is the object of the invention to provide by simple means a roof reflector of the aforementioned type with a layout whereby the satisfactory support of the reflector is assured without the need for replacements and without the generation of thermal stresses.

This object is achieved according to the invention by a roof reflector comprising individual, mutually supporting, wedge-shaped graphite blocks. The roof reflector is fastened to the thermal side shield in a radially expandable manner.

In advantageous embodiments of the invention, the roof reflector may be provided with features such as fastening elements biased in the downward direction. In addition, the roof reflector may advantageously be formed of graphite blocks joined together by means of a groove and spline joint.

The vault-like structural configuration and the above-described mode of fastening of the roof reflector eliminates the above-mentioned layout problems and renders possible the safe and expandable placing of the roof reflector.

An embodiment of the invention is described hereinbelow with reference to the drawing attached hereto.

DETAILED DESCRIPTION OF THE EMBODIMENTS

Figure 1:
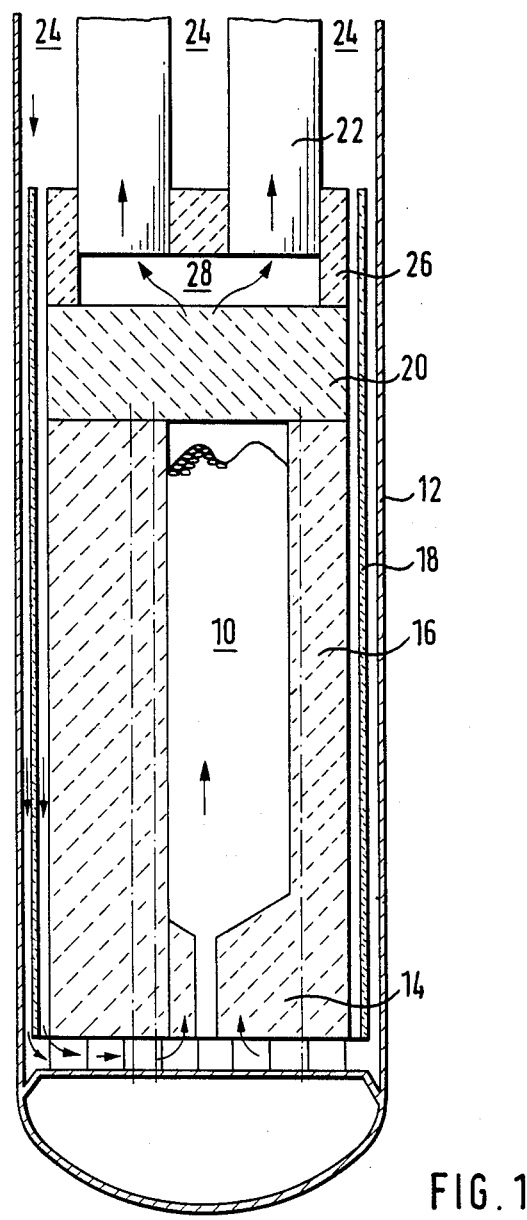
FIG. 1 shows the lower and intermediate area of a nuclear power plant with a small, high temperature reactor.
Figure 2:
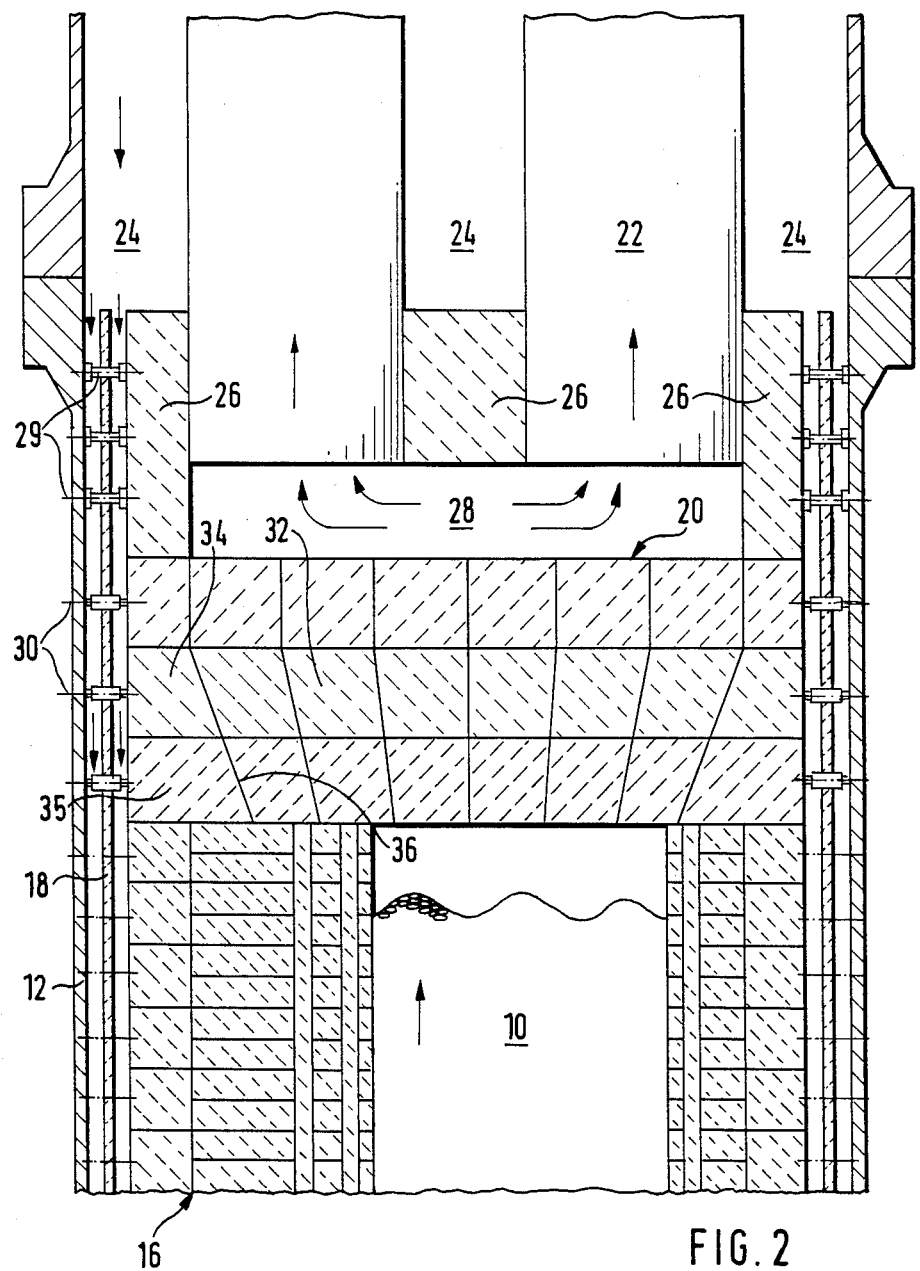
FIG. 2 shows the intermediate area of the nuclear power plant with the roof reflector in an enlarged sectional view.

In FIG. 1, the small, high temperature reactor is located with the reactor core 10 in the lower area of the nuclear power plant. The reactor core 10 is enclosed in the reactor pressure vessel 12. The reactor core 10 is surrounded by a bottom reflector 14, the side reflector 16, the thermal side shield 18, rigidly joined to the latter and the roof reflector 20.

In the upper area of the nuclear power plant, several steam generators 22 are arranged above the small, high temperature reactor. These generators are surrounded laterally by a cold gas collector space 24. Blowers (which are not shown in the drawings) are arranged over the steam generators 22.

A graphite cover 26 is provided over the roof reflector 20 and forms a hot gas collector space 28 located above the roof reflector 20. The cover 26 is rigidly connected in the radial direction with the thermal side shield 18 by means of fastening elements 29. The roof reflector 20, on the other hand, is joined movably in expansion by means of springingly elastic fastening elements 30 with the thermal side shield 18 in the radial direction.

The roof reflector 20 comprises a plurality of graphite blocks 32, combined into several layers located over each other and having downwardly converging lateral surfaces. The blocks 34, 35 forming the border area have, approximately in the manner drawn, internal surfaces 36 extending inwardly and essentially cylindrical outer surfaces, connected with the thermal side shield 18. Due to the mutually supporting graphite blocks, a vault-like, selfsupporting, but flat roof structure of the roof reflector 20 is obtained. A suspension or support of the roof reflector 20 over its entire surface is, therefore, not necessary. The arrows shown indicate the direction of flow of the hot and cold gases, respectively.

The above description describes a preferred embodiment of the invention. It is to be understood however, that the invention is not limited to any single embodiment or feature, but should be construed to cover all modifications and alternative embodiments falling within the scope of the invention as defined by the claims which follow.

What is claimed is:

1. A roof reflector in combination with a small high temperature nuclear reactor having a reactor core, a hot gas collector space arranged above said roof reflector and laterally surrounding said reactor core, and a thermal side shield laterally surrounding said side reflector and said roof reflector, said roof reflector comprising:
   a central support portion consisting essentially of individual, mutually supporting, wedge-shaped graphite blocks supported against each other;
   an annular outer portion laterally surrounding and supporting said central support portion; and
   springingly elastic means for fastening said annular outer portion to said thermal side shield in a radially expandable manner.

2. A roof reflector as in claim 1 wherein said center portion has a plurality of rows of individual, mutually supporting wedge-shaped graphite blocks, and wherein said blocks have downwardly converging lateral surfaces.

* * * * *